(12) United States Patent
Reddy et al.

(10) Patent No.: US 7,543,642 B2
(45) Date of Patent: Jun. 9, 2009

(54) CEMENT COMPOSITIONS CONTAINING FLEXIBLE, COMPRESSIBLE BEADS AND METHODS OF CEMENTING IN SUBTERRANEAN FORMATIONS

(75) Inventors: B. Raghava Reddy, Duncan, OK (US); Krishna M. Ravi, Kignwood, TX (US); Michael J. Szymanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 845 days.

(21) Appl. No.: 10/350,533

(22) Filed: Jan. 24, 2003

(65) Prior Publication Data

US 2004/0144537 A1 Jul. 29, 2004

(51) Int. Cl.
*E21B 33/13* (2006.01)
(52) U.S. Cl. .................. 166/292; 166/293; 106/724; 106/727; 106/823
(58) Field of Classification Search ............... 166/292, 166/293, 294, 295; 106/600; 252/62
See application file for complete search history.

(56) References Cited

U.S. PATENT DOCUMENTS

| | | | |
|---|---|---|---|
| 3,021,291 A * | 2/1962 | Thiessen | |
| 3,044,548 A | 7/1962 | Perry et al. | 33/293 |
| 3,214,393 A | 10/1965 | Sefton | 260/2.5 |
| 3,306,356 A | 2/1967 | Sparlin | 166/33 |
| 3,361,688 A | 1/1968 | Bonitz et al. | 260/2.5 |
| 3,363,689 A | 1/1968 | Smith et al. | |
| 3,649,317 A | 3/1972 | Houseknecht | |
| 3,764,357 A | 10/1973 | Bowles et al. | |
| 3,766,984 A | 10/1973 | Nimerick | 166/294 |
| 3,804,958 A | 4/1974 | Adams | |
| 3,869,295 A | 3/1975 | Bowles et al. | 106/90 |
| 4,010,108 A | 3/1977 | Gablin et al. | 252/301.1 W |
| 4,057,526 A | 11/1977 | de Rook | |
| 4,063,603 A | 12/1977 | Rayborn | 175/65 |
| 4,234,344 A | 11/1980 | Tinsley et al. | 106/88 |
| 4,247,649 A | 1/1981 | Damiens | 521/55 |
| 4,251,576 A | 2/1981 | Osborn et al. | 428/331 |
| 4,302,549 A | 11/1981 | Crowley | |
| 4,303,729 A * | 12/1981 | Torobin | 428/327 |
| 4,303,736 A * | 12/1981 | Torobin | 428/403 |
| 4,304,298 A | 12/1981 | Sutton | 166/293 |
| 4,306,395 A | 12/1981 | Carpenter | |
| 4,340,427 A | 7/1982 | Sutton | 106/87 |
| 4,362,566 A * | 12/1982 | Hinterwaldner | |
| 4,367,093 A | 1/1983 | Burkhalter et al. | 106/87 |
| 4,370,166 A | 1/1983 | Powers et al. | 106/97 |
| 4,398,958 A | 8/1983 | Hodson et al. | |
| 4,450,009 A | 5/1984 | Childs et al. | 106/76 |
| 4,450,010 A | 5/1984 | Burkhalter et al. | 106/87 |
| 4,460,052 A | 7/1984 | Gockel | 175/72 |
| 4,498,995 A | 2/1985 | Gockel | 252/8.5 LC |
| 4,565,578 A | 1/1986 | Sutton et al. | 106/87 |
| 4,676,317 A | 6/1987 | Fry et al. | 166/293 |
| 4,700,780 A | 10/1987 | Brothers | 166/293 |
| 4,703,801 A | 11/1987 | Fry et al. | 166/293 |
| 4,760,882 A | 8/1988 | Novak | 166/295 |
| 4,768,593 A | 9/1988 | Novak | 166/295 |
| 4,806,164 A | 2/1989 | Brothers | 106/90 |
| 4,816,503 A | 3/1989 | Cunningham et al. | 523/521 |
| 4,828,761 A | 5/1989 | Mattus et al. | 252/628 |
| 4,986,354 A | 1/1991 | Cantu et al. | |
| 5,124,186 A | 6/1992 | Wycech | 428/35.8 |
| 5,320,851 A | 6/1994 | de Mars et al. | |
| 5,447,984 A | 9/1995 | Ohama et al. | 524/507 |
| 5,456,751 A | 10/1995 | Zandi et al. | 106/724 |
| 5,569,324 A | 10/1996 | Totten et al. | 106/696 |
| 5,736,594 A | 4/1998 | Boles et al. | |
| 5,779,787 A | 7/1998 | Brothers et al. | 106/802 |
| 5,826,669 A | 10/1998 | Zaleski et al. | 175/72 |
| 5,837,739 A | 11/1998 | Nowak et al. | 521/54 |
| 5,839,520 A | 11/1998 | Maillet | 175/61 |
| 5,872,189 A | 2/1999 | Bett et al. | |
| 5,959,762 A * | 9/1999 | Bandettini et al. | 359/265 |
| 6,143,069 A | 11/2000 | Brothers et al. | |
| 6,197,418 B1 * | 3/2001 | Cloots et al. | 428/332 |
| 6,279,652 B1 | 8/2001 | Chatterji et al. | 166/194 |
| 6,328,038 B1 | 12/2001 | Kessler et al. | |
| 6,367,549 B1 | 4/2002 | Chatterji et al. | 166/292 |

(Continued)

FOREIGN PATENT DOCUMENTS

| | | | |
|---|---|---|---|
| DE | 958698 | * | 2/1957 |
| DE | 964217 | * | 5/1957 |
| DE | 32 09 488 A1 | | 9/1982 |
| DE | 4446968 | | 6/1995 |
| DE | 10033815 | | 1/2000 |
| DE | 10033815 | | 1/2001 |

(Continued)

OTHER PUBLICATIONS

"Hydration and strength of neat portland cement", Chandra et al. Magazine of Concrete Research (1968), 20(64), 131-6.*

(Continued)

*Primary Examiner*—Paul Marcantoni
(74) *Attorney, Agent, or Firm*—Craig W. Roddy; Conley Rose, P.C.

(57) ABSTRACT

Cement compositions comprising flexible, compressible beads, processes for preparing such cement compositions, and methods of cementing in subterranean formations using such cement compositions. One or more flexible, compressible beads are mixed with the cement before pumping the cement into a well bore. The flexible, compressible beads are preferably composed of an elastomeric material such as a copolymer of methylmethacrylate and acrylonitrile; a terpolymer of methylmethacrylate, acrylonitrile, and dichloroethane; a styrene-divinylbenzene copolymer; and polystyrene. The flexible, compressible beads may be heated to expand the beads before mixing with the cement such that the ensuing cement composition will have a desired density. Non-flexible beads such as spherulites may also be added to the cement compositions.

19 Claims, No Drawings

U.S. PATENT DOCUMENTS

| | | | |
|---|---|---|---|
| 6,398,866 B1 | 6/2002 | Wombacher et al. | 106/823 |
| 6,457,524 B1 | 10/2002 | Roddy | 166/293 |
| 6,508,305 B1* | 1/2003 | Brannon et al. | 166/293 |
| 6,516,883 B1 | 2/2003 | Chatterji et al. | 166/293 |
| 6,518,224 B2 | 2/2003 | Wood | 507/118 |
| 6,527,051 B1* | 3/2003 | Reddy et al. | 166/300 |
| 6,545,066 B1 | 4/2003 | Immordino, Jr. | |
| 6,554,071 B1* | 4/2003 | Crook et al. | 166/293 |
| 6,626,991 B1* | 9/2003 | Drochon et al. | 106/672 |
| 6,641,658 B1 | 11/2003 | Dubey | |
| 6,644,405 B2 | 11/2003 | Vijn et al. | |
| 6,645,288 B1 | 11/2003 | Dargaud et al. | 106/696 |
| 6,656,265 B1* | 12/2003 | Garnier et al. | 106/713 |
| 6,732,800 B2* | 5/2004 | Acock et al. | 106/308 |
| 6,742,592 B1* | 6/2004 | Le Roy-Delage et al. | 166/293 |
| 6,814,798 B2 | 11/2004 | Vijn et al. | |
| 6,875,799 B2 | 4/2005 | Nyhus et al. | |
| 2001/0018072 A1 | 8/2001 | Unger | |
| 2002/0108782 A1 | 8/2002 | Boer | 175/7 |
| 2002/0108786 A1 | 8/2002 | Rowden | 175/57 |
| 2004/0007360 A1 | 1/2004 | Leroy-Delage et al. | 166/293 |
| 2004/0040079 A1 | 3/2004 | Snyder | 524/8 |
| 2004/0144537 A1 | 7/2004 | Reddy et al. | |
| 2004/0147406 A1 | 7/2004 | Go Boncan | |
| 2004/0163812 A1 | 8/2004 | Brothers | 166/293 |
| 2004/0211562 A1 | 10/2004 | Brothers et al. | 166/281 |
| 2004/0211564 A1 | 10/2004 | Brothers et al. | 166/293 |
| 2004/0244978 A1 | 12/2004 | Shaarpour | 166/293 |
| 2004/0251026 A1 | 12/2004 | Dargaud et al. | 166/292 |
| 2005/0061206 A1 | 3/2005 | Reddy et al. | |
| 2005/0113262 A1 | 5/2005 | Ravi et al. | |

FOREIGN PATENT DOCUMENTS

| | | | |
|---|---|---|---|
| EP | 1 348 831 A1 | | 10/2003 |
| FR | 2762595 | | 4/1997 |
| FR | 2 787 441 | | 6/2000 |
| GB | 743866 | | 1/1956 |
| GB | 1118621 | * | 7/1968 |
| GB | 1225299 | * | 3/1971 |
| GB | 2 083 099 | | 3/1982 |
| GB | 2 354 236 A | | 3/2001 |
| HU | 58666 | | 10/1989 |
| HU | 51583 | | 5/1990 |
| HU | 58666 | * | 3/1992 |
| JP | 49019687 | * | 5/1974 |
| JP | 50126715 | | 10/1975 |
| JP | 56041859 | * | 4/1981 |
| JP | 56092153 | * | 7/1981 |
| JP | 60246280 | * | 12/1985 |
| JP | 62188999 | | 8/1987 |
| JP | 63185872 | | 8/1988 |
| JP | 01109551 | * | 4/1989 |
| JP | 011574475 | * | 6/1989 |
| JP | 03257049 | | 3/1990 |
| JP | 05301786 | | 11/1993 |
| JP | 05319955 | * | 12/1993 |
| JP | 06313130 A | | 11/1994 |
| JP | 407187585 A | | 7/1995 |
| JP | 407187858 A | | 7/1995 |
| JP | 07291760 | | 11/1995 |
| JP | 09116158 | * | 5/1997 |
| JP | 11268962 | | 10/1999 |
| JP | 2000095584 | * | 4/2000 |
| RU | 2154619 | * | 8/2000 |
| RU | 2178320 | * | 1/2002 |
| VE | 52882 | | 2/1992 |
| VE | 52883 | | 2/1992 |
| VE | 53935 | | 8/1992 |
| VE | 53936 | | 8/1992 |
| WO | WO 00/20350 | | 4/2000 |

OTHER PUBLICATIONS

"Ultra Thin Flexible glass substrates" Plichta et al. Mat'ls Research Society Symposium Proceedings (2003), 769 (Flexible Electronics-Mat'ls and Device Technology), 273-282.*

"Optimized indium tin oxide contact for organic light emitting diode applications" Zhu e al., Institute of Mat'ls Researh and Engineering, Singapore, Thin Solid Films (2000), 363 (1,2), 314-317.*

"Ultrathin glass for flexible OLED application"Auch et al., Institute of Mat'ls Research and Engineering, Singapore, Thin Solid Films 2002, 417 (1-2), 47-50.*

"Force Measurements for the movement of a water drop on a surface with a surface tension gradient" Suda et al. Langmuir (2003), 19(3), 529-531.*

"A quantitative analysis of single protein lingand complex separation with force microscope" Shapiro, Biophysical Chemistry (1997), 67 (1-3), 211-219.*

"High peak power pulsed CO2 laser light delivery by hollow glass waveguides", Dai et al., Applied Optics (1997), 36(21), 5072-5077.*

"Energy of Dissociation of lipid bilayer from the membrane skeleton of red blood cells" Biophysical Journal, Hwang et al. (1997), 72(6), 2669-2678.*

"Small bore hollow waveguides for delivery of a 3mu laser radiation", Kozodoy et al., Applied Optics (1996), 35 (7), 1077-1082.*

Hawley's Condensed Chemical Dictionary, Twelfth Edition, Lewis (1993) pp. 922 and 941. Cited for definitions of "plastic" and "polystyrene".*

"The properties of the lightweight concrete composed of cemnt, water, and expandable styrene beads", Kawano et al. Central Research lab, Onoda Cem Co. Ltd Tokyo Japan, Onoda Kenkyu Hokoku 1973, 25(89), 85-95.*

Hawley's Condensed Chemical Dictionary, Twelfth Edition, Lewis (1993), definition of elastomer on p. 455.*

Hawley's Condensed Chemical Dictionary, Twelfth Edition, Lewis (1993), definition of fluid on p. 528.*

3M Speciality Materials For the Oil & Gas Industry brochure dated Jun. 2001.

3M™ Microspheres brochure dated Sep. 2000.

3M Scotchlite™ Glass Bubbles brochure dated Jul. 1999.

Expancel brochure dated Jan. 2003.

Halliburton brochure entitled "Spherelite Cement Additive" dated 1999.

Patent application entitled "Variable Density Fluids and Methods of Use In Subterranean Formations" by Krishna M. Ravi et al., U.S. Appl. No. 10/721,055, filed Nov. 24, 2003.

Patent application entitled "Cement Compositions With Improved Mechanical Properties and Methods of Cementing In Subterranean Formation" by Krihsna M. Ravi et al., U.S. Appl. No. 10/745,470, filed Dec. 22, 2003.

Patent application entitled "Cement Compositions Containing Flexible, Compressible Beads and Methods of Cementing In Subterranean Formations" by B. Raghava Reddy et al., U.S. Appl. No. 10/982,028, filed Nov. 5, 2004.

Korla, J. et al., "Performance of hollow plastic microspheres in superplasticized concretes" dated Oct. 18, 1986.

Chandra, D. et al., "Hydration and Strength of neat portland cement" May 12, 1984.

Mackerle, J., Rubber and rubber-like materials, finite-element analyses and simulations: a bibliogrpahy (1976-1997).

Office action dated Sep. 10, 2004 from U.S. Appl. No. 10/745,470.

Office action dated Dec. 23, 2004 from U.S. Appl. No. 10/745,470.

Office action dated Jul. 12, 2005 from U.S. Appl. No. 10/745,470.

Office action dated Oct. 31, 2005 from U.S. Appl. No. 10/982,028.

Office action dated Jan. 31, 2006 from U.S. Appl. No. 10/745,470.

Office action dated Apr. 10, 2006 from U.S. Appl. No. 10/745,470.

Office action dated Apr. 20, 2006 from U.S. Appl. No. 10/982,028.
Office action dated Jul. 20, 2006 from U.S. Appl. No. 10/982,028.
Foreign communication from a related counterpart application dated Mar. 16, 2005.
Ravi, Kris et al., "Cement Compositions With Improved Mechanical Properties and Methods of Cementing In . . . " filed Dec. 22, 2003 as U.S. Appl. No. 10/745,470.
Office Action dated Jan. 11, 2007 for U.S. Appl. No. 10/982,028.

"Expancel® Microspheres—The Product;" www.expancel.com; printed May 25, 2007; 1 pg.
"Expancel;" Boud Minerals & Polymers, Supplying Minerals and Polymers to Industry; www.boud.com/expancel.htm; printed May 25, 2007; 3 pgs.
"Chemical Resistance of Expancel® Unexpanded Microspheres;" Technical Bulletin No. 7; Akzo Nobel; Jun. 26, 2003; 4 pgs.

* cited by examiner

CEMENT COMPOSITIONS CONTAINING FLEXIBLE, COMPRESSIBLE BEADS AND METHODS OF CEMENTING IN SUBTERRANEAN FORMATIONS

FIELD OF THE INVENTION

This invention generally relates to cementing in subterranean formations penetrated by well bores. More specifically, the invention relates to cement compositions comprising flexible, compressible beads, and processes for making the compositions.

BACKGROUND OF THE INVENTION

Well cementing is a process used in penetrating subterranean zones (also known as subterranean formations) to recover subterranean resources such as gas, oil, minerals, and water. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement and water is placed in the annulus and permitted to set into a hard mass (i.e., sheath) to thereby attach the string of pipe to the walls of the well bore and seal the annulus.

Low density or lightweight cement compositions are commonly used in wells that extend through weak subterranean formations to reduce the hydrostatic pressure exerted by the cement column on the weak formation. Conventional lightweight cement compositions are made by adding more water to reduce the slurry density. Other materials such as bentonite, diatomaceous earth, and sodium metasilicate may be added to prevent the solids in the slurry from separating when the water is added. Unfortunately, this method has the drawback that the addition of more water increases the cure time and reduces the strength of the resulting cement.

Lightweight cement compositions containing hollow spheres have been developed as a better alternative to the cement compositions containing large quantities of water. The hollow spheres are typically cenospheres, glass hollow spheres, or ceramic hollow spheres. Cenospheres are hollow spheres primarily comprising silica ($SiO_2$) and alumina ($Al_2O_3$) and are filled with gas. Cenospheres are a naturally occurring by-product of the burning process of a coal-fired power plant. Their size may vary from about 10 to 350 μm. These hollow spheres reduce the density of the cement composition such that less water is required to form the cement composition. The curing time of the cement composition is therefore reduced. Further, the resulting cement has superior mechanical properties as compared to cement formed by adding more water. For example, the tensile and compressive strengths of the cement are greater.

During the life of the well, the cement sheath is subjected to detrimental cyclical stresses due to pressure and temperature changes resulting from operations such as pressure testing, drilling, fracturing, cementing, and remedial operations. Conventional hollow spheres suffer from the drawback of being brittle and fragile and thus often cannot sustain those cyclical stresses. As a result, the cement sheath develops cracks and thus fails to provide zonal isolation for the life of the well. A need therefore exists to develop a less brittle cement having properties that would enable it to withstand pressure and temperature fluctuations for the life of the well. The present invention advantageously provides cement compositions that can withstand the cyclical stresses that occur during the life of the well.

SUMMARY OF THE INVENTION

The present invention includes cement compositions comprising flexible, compressible beads, a process for preparing such cement compositions, and methods for cementing a well bore in a subterranean formation using such cement compositions. One or more flexible, compressible beads are mixed with the cement before pumping the cement slurry into a well bore. The flexible, compressible beads are preferably composed of an elastomeric material such as a copolymer of methylmethacrylate and acrylonitrile; a terpolymer of methylmethacrylate, acrylonitrile, and vinylidene dichloride; phenolic resins; a styrene-divinylbenzene copolymer; and polystyrene. The flexible, compressible beads may be heated to expand the beads before mixing with the cement such that the ensuing cement composition will have a desired density. Non-flexible beads such as glass hollow beads, cenospheres, and ceramic hollow spheres may also be added to the cement.

DETAILED DESCRIPTION OF THE PREFERRED EMBODIMENTS

In accordance with the invention, a relatively lightweight cement composition is formed by combining flexible, compressible beads with a hydraulic cement and a fluid such as water. Any suitable flexible, compressible bead that may expand and contract and that is compatible with a cement (i.e., chemically stable over time upon incorporation into the cement) may be combined with the cement to reduce its density. Flexible bead as used herein refers to a bead that may expand and contract without adverse effect to the structure of the bead in response to changes in pressure and/or temperature. Preferred flexible, compressible beads are substantially hollow objects filled with fluid (preferably gas), preferably spherical or substantially spherical in shape, and having a flexible outer wall. Preferred flexible, compressible beads have a diameter of about 6 to 150 micrometers at 25° C. and atmospheric pressure. Preferably, the fluid inside the flexible, compressible beads is air, carbon dioxide, an inert gas such as nitrogen, or an organic liquid with a low boiling point such as n-butane, isobutane or pentane. Preferably, the flexible, compressible beads have a substantially uniform, flexible outer wall comprising of one or more elastomeric materials or polymers. The temperature at which the elastomeric material melts or becomes so soft that it loses its ability to contain the fluid and/or expand and contract is desirably higher than the temperature in the well bore, which may range from about 120° F. to about 400° F. The elastomeric material is preferably a styrenic polymer, more preferably a copolymer of methylmethacrylate and acrylonitrile or a terpolymer of methylmethacrylate, acrylonitrile, and vinylidene dichloride. Flexible, compressible beads composed of this copolymer and this terpolymer are commercially available from Akzo Nobel, Inc., which is located in Duluth, Ga., under the tradename EXPANCEL. Several grades of EXPANCEL beads are available and may be selected depending upon the degree of expansion, the physical state, and the temperature range for a given application. Other suitable materials that may be used to form the flexible wall include, but are not limited to, a styrene-divinylbenzene copolymer and polystyrene. Hollow polystyrene beads are available from many polystyrene suppliers, such as Huntsman Corporation of Houston, Tex. (sold as GRADE 27, GRADE 51, or GRADE 55) and BASF Corporation of North Mount Olive, N.J. (sold under the tradename STYROPOR). The flexible, compressible beads are incorporated into the cement in a concentration of preferably from about 1% to about 200% by weight of the cement (bwoc), more preferably from about 2% to about 100%, and most preferably from about 5% to about 50%.

In some embodiments, the flexible, compressible beads may be expanded before mixing with the cement by heating the flexible, compressible beads to soften the wall of the bead and to increase the pressure of the fluid (e.g., gas) therein. Preferred flexible, compressible beads are capable of expanding up to 8 times their original diameters (i.e., the diameter at 25° C. and atmospheric pressure). For example, EXPANCEL beads having a diameter in the range of 6 to 40 microns, upon expansion increase to a diameter of 20 to 150 microns. When exposed to heat, the beads can expand up to forty times or greater their original volumes. The expansion of the beads is generally measured by the decrease in the specific gravity of the expanded material. Thus, for example, when EXPANCEL beads are heated to above 212° F., the density of the beads decreases from 1,000 grams per liter for the unexpanded beads to about 30 grams per liter for the expanded beads. The temperature at which the flexible, compressible beads are heated depends on the polymer composition of the bead wall and the desired density of the cement composition, which is typically in a range of from about 6 to about 23 lb/gal. The flexible, compressible beads may be added to the cement composition by dry blending with the cement before the addition of a fluid such as water, by mixing with the fluid to be added to the cement, or by mixing with the cement slurry consecutively with or after the addition of the fluid. The beads may be presuspended in water and injected into the cement mix fluid or into the cement slurry as an aqueous slurry. Surfactants may be added to the composition to water-wet the surface of the beads so that they will remain suspended in the aqueous phase even if the density of the beads is less than that of the water. The surfactants are preferably nonionic, with a Hydrophile-Lipophile Balance values in the range 9-18. The ability of a surfactant to emulsify two immiscible fluids, such as oil and water, is often described in terms of Hydrophile-Lipophile balance (HLB) values. These values, ranging from 0 to 40, are indicative of the emulsification behavior of a surfactant and are related to the balance between hydrophilic and lipophilic portions of the molecules. In general, surfactants with higher HLB values are more hydrophilic than those with lower HLB values. As such, they are generally more soluble in water and are used in applications where water constitutes the major or external phase and a less polar organic fluid constitutes the minor or internal phase. Thus, for example, surfactants with HLB values in the range 3-6 are suitable for producing water-in-oil emulsions, whereas those with HLB values in the 8-18 range are suitable for producing oil-in-water emulsions. A commonly used formula for calculating HLB values for nonionic surfactants is given below:

$$HLB = 20 \times M_H/(M_H + M_L)$$

where $M_H$ is the formula weight of the hydrophilic portion of the molecule and $M_L$ is the formula weight of the lipophilic portion of the molecule.

When mixtures of surfactants are used, the overall HLB values for the mixture is calculated by summing the HLB contributions from different surfactants as shown in equation below:

$$HLB = (\phi_1 \times HLB_1 + \phi_2 \times HLB_2 + \ldots + \ldots \text{etc.})$$

where $\phi_1$ is the weight fraction of surfactant #1 in the total mixture, $HLB_1$ is the calculated HLB value of surfactant #1, $\phi_2$ is the weight fraction of surfactant #2 in the total surfactant mixture, and $HLB_2$ is the calculated HLB value of the surfactant #2, and so on.

It has been observed that a mixture of a preferentially oil-soluble surfactant and a preferentially water-soluble surfactant provides better and more stable emulsions. In particular, non-ionic ethoxylated surfactant mixtures containing from about 4 to about 14 moles of ethylene oxide. The HLB ratio for a single surfactant or a surfactant mixture employed in the present invention preferably ranges from about 7 to about 20, more preferably from about 8 to about 18.

In one embodiment, a cement slurry densified by using a lower water to cement ratio is lightened to a desired density by the addition of unexpanded or pre-expanded flexible, compressible beads in order to make the final cement less brittle.

In another embodiment, hollow, non-flexible beads are mixed with the cement and the flexible, compressible beads. Particularly suitable non-flexible beads are cenospheres, which are commercially available from, for example, PQ Corporation of Valley Forge, Philadelphia under the tradename EXTENDOSPHERES, from Halliburton Energy Services Inc. under the tradename SPHERELITE, and from Trelleborg Fillite Inc. of Atlanta, Ga. under the tradename FILLITE. Alternatively, the non-flexible beads may be glass beads or ceramic beads. The non-flexible beads, particularly the industrial waste product of the cenosphere type, are relatively inexpensive as compared to the polymeric flexible, compressible beads. However, the non-flexible beads are more likely to break when subjected to downhole temperature and pressure changes and provide brittle cement compositions.

The presence of the flexible, compressible beads in the cement composition provides several benefits. For example, the flexible, compressible beads protect the ensuing hardened cement from experiencing brittle failure during the life of the well even if some of the non-flexible beads collapse. That is, the flexible wall and the gas inside of each bead contracts under pressure and expands back to its original volume when the pressure is removed, thus providing a mechanism for absorbing the imposed stress. The absorption of energy by the flexible wall is expected to reduce the breakage of the more brittle beads when such compositions are used. The flexible wall and the enclosed fluid also expand when the temperature in the well bore increases, and they contract when the temperature decreases. Further, the flexible, compressible beads improve the mechanical properties of the ensuing cement, such as its ductility and resilience. Cement comprising flexible, compressible beads gains the following beneficial physical properties as compared to the same cement composition without the flexible, compressible beads: lower elastic (Young's) modulus, greater plastic deformation, increased tensile strength, and lower Poisson's ratio without significantly compromising other desirable properties such as compressive strength.

In determining the relative amounts of flexible, compressible beads and non-flexible beads to add to the cement composition to decrease its density, the additional costs incurred by using the flexible, compressible beads should be weighed against the benefits provided by using the flexible, compressible beads. For example, the amount of flexible, compressible beads added to the cement may be in the range of from about 2% bwoc to about 20% bwoc, and the amount of non-flexible beads in the cement may be in the range of from about 10% bwoc to about 100% bwoc.

Any known cement may be utilized in the present invention, including hydraulic cements composed of calcium, aluminum, silicon, oxygen, and/or sulfur which set and harden by reaction with water. Examples of suitable hydraulic cements are Portland cements, pozzolana cements, gypsum cements, high alumina content cements, silica cements, and high alkalinity cements. The cement is preferably a Portland cement, more preferably a class A, C, G, or H Portland cement, and most preferably a class A, G, or H Portland cement. A sufficient amount of fluid is also added to the cement to form a pumpable cementitious slurry. The fluid is preferably fresh water or salt water, i.e., an unsaturated aqueous salt solution or a saturated aqueous salt solution such as brine or seawater. The amount of water present may vary and is preferably selected to provide a cement slurry having a desired density. The amount of water in the cement slurry is preferably in a range of from about 30% bwoc to about 120% bwoc, and more preferably in a range of from about 36% bwoc to about 54% bwoc.

As deemed appropriate by one skilled in the art, additional additives may be added to the cement composition for improving or changing the properties of the ensuing hardened cement. Examples of such additives include, but are not limited to, set retarders such as lignosulfonates, fluid loss control additives, defoamers, dispersing agents, set accelerators, and formation conditioning agents. Other additives that may be introduced to the cement composition to prevent cement particles from settling to the bottom of the fluid are, for example, bentonite and silica fume, which is commercially available from Halliburton Energy Services Inc. under the tradename SILICALITE. Further, a salt such as sodium chloride may be added to the cement composition when the drilling zone has a high salt content.

In preferred embodiments, a well cementing process is performed using the cement composition containing the flexible, compressible beads. The well cementing process includes drilling a well bore down to the subterranean zone while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. The cement composition comprising flexible, compressible beads is then displaced down through the pipe and up through the annulus, where it is allowed to set into a bard mass. In alternative embodiments, the cement composition may be used for other projects such as masonry or building construction.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

A cement slurry containing EXPANCEL flexible, compressible beads in accordance with the present invention was formed by mixing together the following components according to the procedure described in American Petroleum Institute (API) Specification 10, 5$^{th}$ Edition, Jul. 1, 1990: class H cement, water (117.20% bwoc); SILICALITE silica fume (16.9% bwoc); bentonite (4.0% bwoc); HALAD-344 fluid loss additive available from Halliburton Energy Services (0.5% bwoc); SCR-100 cement set retarder available from Halliburton Energy Services (0.3% bwoc); sodium chloride (18% bwoc); and defoamer (0.025 gal/sk). A dry mixture of SPHERELITE cenospheres available from Halliburton Energy Services (55% bwoc) and EXPANCEL 53 WU beads (10% bwoc), which are composed of a copolymer of methyl methacrylate and acrylonitrile having a softening temperature above 200° F., was added to the slurry with slow agitation. The slurry was subjected to a pressure of 4,000 psi in an autoclave to simulate the breakage of the cenospheres under downhole conditions. The slurry density values before and after pressurizing are reported in Table 1 below. A portion of the cement slurry was then poured into 2"×2"×2" brass cube molds and cured at 135° F. in a pressure chamber under a pressure of 5,200 psi. Another portion of the slurry was poured into 1"×2" cylindrical steel molds and cured at the same temperature. The compressive strengths were measured on 2"×2"×2" molds using strength testing equipment manufactured by Tinius Olsen of Willow Grove, Pa., according to American Society for Testing and Materials (ASTM) procedure C190-97. A load versus displacement study was performed on 1"×2" cylinders using a MTS load frame instrument manufactured by MTS Systems Corporation of Eden Prairie, Minn. without using any confining pressures (shown below in Tables 2 and 3).

Example 2

The procedure of Example 1 was followed except that the EXPANCEL 53 beads were replaced with EXPANCEL 820 WU beads, which are composed of a terpolymer of methylmethacrylate, vinylidene dichloride, and acrylonitrile having a softening temperature above 167° F.

Example 3

The procedure of Example 1 was followed except that the EXPANCEL 53 beads were replaced with EXPANCEL 551 WU beads, which are composed of a terpolymer of methylmethacrylate, vinylidene dichloride, and acrylonitrile having a softening temperature above 200° F.

Comparative Example 1

Conventional cement slurry containing SPHERELITE non-flexible beads but no flexible, compressible beads was formed by mixing together the following components: class H cement, water (117.20% bwoc); SILICALITE silica fume (16.9% bwoc); bentonite (4.0% bwoc); HALAD-344 fluid loss additive (0.5% bwoc); SCR-100 cement set retarder (0.3% bwoc); sodium chloride (18% bwoc); defoamer (0.025 gal/sk); and SPHERELITE beads (65% bwoc). The cement slurry was cured in the same manner as described in Example 1. The compressive strength and load versus displacement analysis were also performed as described in Example 1. Note that the density values for the slurries in Examples 1-3 and that of the slurry in Comparative Example 1 are essentially identical considering the experimental error in the method of measurement (see Table 1).

TABLE 1

|  | Example 1 | Example 2 | Example 3 | Comparative Example 1 |
|---|---|---|---|---|
| SPHERELITE Beads, % bwoc | 55 | 55 | 55 | 65 |
| EXPANCEL 53 Beads, % bwoc | 10 | — | — | — |
| EXPANCEL 820 Beads, % bwoc | — | 10 | — | — |
| EXPANCEL 551 Beads, % bwoc | — | — | 10 | — |
| Slurry Density, ppg @ atm. Pressure | 10.5 | 10.5 | 10.4 | 10.4 |
| Slurry Density, ppg after pressurizing @ 4000 psi for 5 min. | 11.3 | 11.3 | 11.3 | 11.3 |

The bulk mechanical properties of the cements in the examples and comparative examples are shown below in Table 2:

TABLE 2

|  | Compressive Strength @ 135° F. for 24 hrs, psi | Poisson's Ratio | Young's Modulus e (+6), psi |
|---|---|---|---|
| Example 1 | 1820 | 0.193 | 0.763 |
| Example 2 | 1920 | 0.196 | 0.768 |
| Example 3 | 2120 | 0.194 | 0.683 |
| Comparative Example 1 | 1675 | 0.221 | 0.82 |

As shown in Table 2, the compressive strengths of the cements containing both flexible, compressible and non-flexible beads (Examples 1-3) are greater than the compressive strengths of the cement containing only non-flexible beads (Comparative Example 1). The Young's Modulus values of the cements in Examples 1-3 are lower than the Young's modulus value of the cement in Comparative Example 1, indicating that replacement of a portion of the brittle beads with flexible, compressible beads decreased the brittleness and improved the resiliency of the composition. Young's Modulus measures the interparticle bonding forces and thus the stiffness of a material. As such, the cements in Examples 1-3 are less stiff than the cement in Comparative Example 1, which contains no flexible, compressible beads, and at the same time remain resilient up to higher stress levels.

This result is surprising because, in general, when a softer or a more flexible (lower Young's modulus) material is added to a brittle material, the final composition has a lower compressive strength as well as a lower Young's modulus. In the present case, even though the Young's modulus decreased as expected, the compressive strength increased, suggesting synergistic interaction between the flexible, compressible beads and the non-flexible, brittle beads. Without being limited by theory, it is believed that the stress imposed in a compressive mode is absorbed effectively by the flexible, compressible beads, resulting in increased load values at which the brittle beads, and thus the entire composition fails.

The mechanical properties at the yield points of the cements formed in Examples 1-3 and Comparative Example 1 were obtained from the load vs displacement data analysis. These mechanical properties are presented below in Table 3:

TABLE 3

|  | Axial Stress @ Yield, psi (avg) | Radial Strain @ Yield, Microinch/inch | Axial Strain @ Yield Microinch/inch | Axial Strain to Radial Strain ratio | Area Under Axial Curve @ Yield | Area Under Radial Curve @ Yield | Poisson's Ratio @ Yield | Young's Modulus @ Yield, psi e (+6) |
|---|---|---|---|---|---|---|---|---|
| Example 1 | 2115 | 1480 | 4760 | 3.22 | 6710 | 2550 | 0.31 | 0.44 |
| Example 2 | 2215 | 1635 | 5190 | 3.17 | 7750 | 2930 | 0.43 | 0.43 |
| Example 3 | 1580 | 1460 | 3960 | 2.71 | 4110 | 1810 | 0.37 | 0.40 |
| Comparative Example 1 | 1760 | 3555 | 4390 | 1.24 | 5250 | 4440 | 0.42 | 0.49 |

As shown in Table 3, the radial strain values at yield (i.e., the elastic limit) for the cements in Examples 1-3 are much lower than the radial strain at yield for the cement in Comparative Example 1 due to the compressible nature of the flexible hollow beads under pressure. Moreover, the axial strain to radial strain ratios of the cements in Examples 1-3 are higher than the axial strain to radial strain ratio of the cement in Comparative Example 1. Therefore, when axial pressure is imposed on the cement column in the well bore, the radial expansion is significantly less for the cements containing both flexible, compressible and non-flexible beads as compared to the cement containing only non-flexible beads because of the reduction in volume of the cements containing the compressible, flexible beads. A significant radial expansion under axial stress is expected for cements containing non-flexible beads such as those described in Comparative Example 1 or in cements where water is used to decrease the density. The Poisson's Ratio and Young's Modulus values at yield for the cements in Examples 1-3 tend to be lower than or comparable to those values at yield for the cement in Comparative Example 1, as shown in Table 2. The total area under a load vs displacement curve reflects the ability of a material to absorb the imposed stress in the direction of displacement. Comparing the areas under the radial curves for the cement compositions in Examples 1-3 and the cement compositions in Comparative Example 1 indicates the unique advantage the addition of flexible, compressible beads provides to the cement composition. Due to their compressible nature, the beads absorb the axial stress without having to distribute the stress in a radial direction. As a result, the radial dissipation of imposed axial stress is significantly lower for the compositions in Examples 1-3 than for the compositions in Comparative Example 1. This result clearly indicates that during the life of the well, the imposed stresses will be primarily absorbed by the flexible, compressible beads without requiring changed dimensions to the cement columns.

Example 4

EXPANCEL 53 WU beads were suspended in three times the volume of water compared to that of the beads, and the resulting slurry was charged into a cylindrical stainless steel can provided with a lid to which a stirring paddle was connected. The slurry filled ¼ the available volume in the can after the lid was fitted. The can was then inserted into a heated water bath of a HOWCO cement consistometer manufactured by Halliburton Energy Services. The motor in the consistometer was turned which rotated the metal can while holding the lid steady. After stirring the assembly in this manner for a period of time at a desired temperature, the can was disassembled, and the expanded solid therein was filtered and dried in open air at ambient temperature. This procedure was repeated at different heating temperatures and times to obtain expanded beads of different specific gravities. In particular, when EXPANCEL 53 WU beads of specific gravity 1.1 were heated at 170° F. for 4 hours, the specific gravity of the expanded beads was 0.345; whereas when the same material was heated to 200° F. for 4 hours, the specific gravity of the expanded beads was 0.1.

A cement slurry having a density of 11.3 pounds per gallon was prepared according to the API procedure mentioned previously by mixing class C cement with water (57% bwoc), SILICALITE fumed silica (15% bwoc), CFR-3 dispersant supplied by Halliburton Energy Services (2% bwoc), the EXPANCEL 53 WU beads of specific gravity 0.3 pre-expanded as described above (9.8% bwoc), the EXPANCEL 53 WU beads of specific gravity 0.1 pre-expanded as described above (2.6% bwoc), and a defoamer (2% bwoc). The slurry was poured into cylindrical plastic containers of dimensions 2"×4", closed with lids, and cured at room temperature for 24 hours until the cement slurry solidified. The plastic containers were transferred to a water bath kept at 180° F. for 18 hours, and the samples were submitted to cyclical load/displacement studies using the equipment described in Example 1. The cyclic load/displacement studies were performed by measuring the force to break an initial sample, followed by cycling the loads of subsequent samples between 20% and 90% of the load force to break the initial sample. When the load force reached the maximum or minimum value, a two second resting time was maintained before the beginning of the next cycle. The axial and radial displacements were measured as a function of load force. The initial compressive strengths were measured either under no confining pressure, or a confining pressure of 1000 psi. The results are shown in Table 4.

Comparative Example 2

Cement samples were prepared as described in Example 4 except that the EXPANCEL 53 WU beads were replaced with SPHERELITE cenospheres (25% bwoc). The slurry density was 12.6 pounds per gallon. The samples Were submitted for cyclic load/displacement analysis. The results arc shown in Table 4.

TABLE 4

| Sample | Confining Pressure, psi | Compressive Strength, psi | # Cycles to Break |
|---|---|---|---|
| Comparative Example 2 | None | 6960 | 120 |

TABLE 4-continued

| Sample | Confining Pressure, psi | Compressive Strength, psi | # Cycles to Break |
|---|---|---|---|
| Comparative Example 2 | 1000 | 8000 | 200 |
| Example 4 | None | 3250 | 120 |
| Example 4 | 1000 | 3300 | 240 |

The results in Table 4 show that the composition containing the flexible beads lasted longer under cyclic loading and unloading of pressure under confining conditions. The confining pressure is applied to simulate the confinement on a cement column from the formation or another casing pipe.

Comparative Example 3

A cement slurry having a density of 12.02 pounds per gallon was prepared using the API procedure mentioned in Example 1 by mixing class H cement with water (54% bwoc), unexpanded hollow polystyrene beads of EPS (expandable polystyrene) grade, ethoxylated (10 moles) nonylphenol (0.04 gallon per sack of cement), and a defoamer. The slurry was poured into cubic molds as described in Example 1 and cured in an autoclave at 155° F. for 24 hours under a pressure of 3,000 psi. The pressure was released, and the density of the slurry was measured to be 12.3 pounds per gallon. The measured density of the slurry after curing under pressure was similar to the original slurry density, suggesting that the polystyrene beads were essentially non-compressible.

Example 5

EPS grade hollow polystyrene beads of specific gravity 1.01 were heated in water to 170° F. for 3 hours following the procedure described in Example 4. The expanded beads were filtered and dried. The specific gravity of the expanded beads was 0.1.

A cement slurry having a 12.08 pounds per gallon density was prepared as described in Comparative Example 3 except that the unexpanded hollow polystyrene beads were replaced with the pre-expanded polystyrene beads of specific gravity of 0.1. The slurry was cured under the same conditions as described in Comparative Example 3. The density measured after curing under pressure was 14.9 pounds per gallon, clearly indicating that pre-expansion of the beads made them flexible and compressible.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing a wellbore in a subterranean formation comprising the steps of:

preparing a cement composition by mixing hydraulic cement, water, and one or more beads having an elastomeric, flexible outer wall and filled with a fluid, wherein in response to post-curing changes in pressure, temperature, or both the fluid expands or contracts thereby causing the elastomeric, flexible outer wall of the bead to likewise expand or contract;

expanding the beads before introducing the beads to the cement composition;

placing the cement composition into the subterranean formation; and allowing the cement composition to set.

2. The method of claim 1 wherein said expanding the beads comprises heating the beads.

3. The method of claim 1 wherein the beads comprise an elastomeric material selected from the group consisting of a copolymer of methylmethacrylate and acrylonitrile; a terpolymer of methylmethacrylate, acrylonitrile, and vinylidene dicliloride; a styrene-divinylbenzene copolymer; phenolic resins; and polystyrene.

4. A method of cementing a wellbore in a subterranean formation comprising the steps of:

preparing a cement composition by mixing hydraulic cement, water, and one or more pre-expanded beads having an elastomeric, flexible outer wall and filled with a fluid, wherein in response to post-curing changes in pressure, temperature, or both the fluid expands or contracts thereby causing the elastomeric, flexible outer wall of the bead to likewise expand or contract;

placing the cement composition into the subterranean formation; and allowing the cement composition to set.

5. The method composition of claim 1 wherein the beads are capable of expanding up to about 8 times its original diameter.

6. The method of claim 1 wherein the beads contain a liquid.

7. The method of claim 1 wherein the beads contain a gas.

8. The method of claim 7 wherein the gas is selected from the group consisting of air, carbon dioxide, nitrogen, n-butane, isobutane, pentane, and combinations thereof.

9. The method of claim 1 wherein the beads have a diameter ranging from about 6 to about 150 micrometers at a temperature of 25° C. and at atmospheric pressure.

10. The method of claim 1 wherein the beads are introduced to the cement composition in an amount in the range of from about 1% to about 200% by weight of cement therein.

11. The method of claim 1 wherein the cement composition comprises water.

12. The method of claim 1 wherein the cement composition further comprises at least one of non-flexible beads, a surfactant, silica fume, bentonite, a fluid loss agent, a retarding agent, sodium chloride, and a defoamer.

13. The method of claim 1 wherein the cement composition further comprises at least one of ceramic spheres, glass spheres, and cenospheres.

14. The method of claim 1 further comprising introducing the beads to water before the beads are introduced to the cement composition.

15. The method of claim 14 further comprising introducing a surfactant or a mixture of surfactants to the cement composition thereby causing the beads to be suspended in an aqueous phase.

16. The method of claim 15 wherein the surfactant or the mixture of surfactant has a HLB ratio ranging from about 7 to about 20.

17. The method of claim 1 wherein said expanding the beads comprises heating the beads and water.

18. The method of claim 1 wherein the cement composition has a density in a range of from about 6 to about 23 lb/gal.

19. The method of claim 2 wherein the beads are heated by heating the beads in water.

* * * * *